P. D. SKAHEN.
SECTIONAL SHEET METAL PULLEY.
APPLICATION FILED FEB. 26, 1907.
917,173.
Patented Apr. 6, 1909.
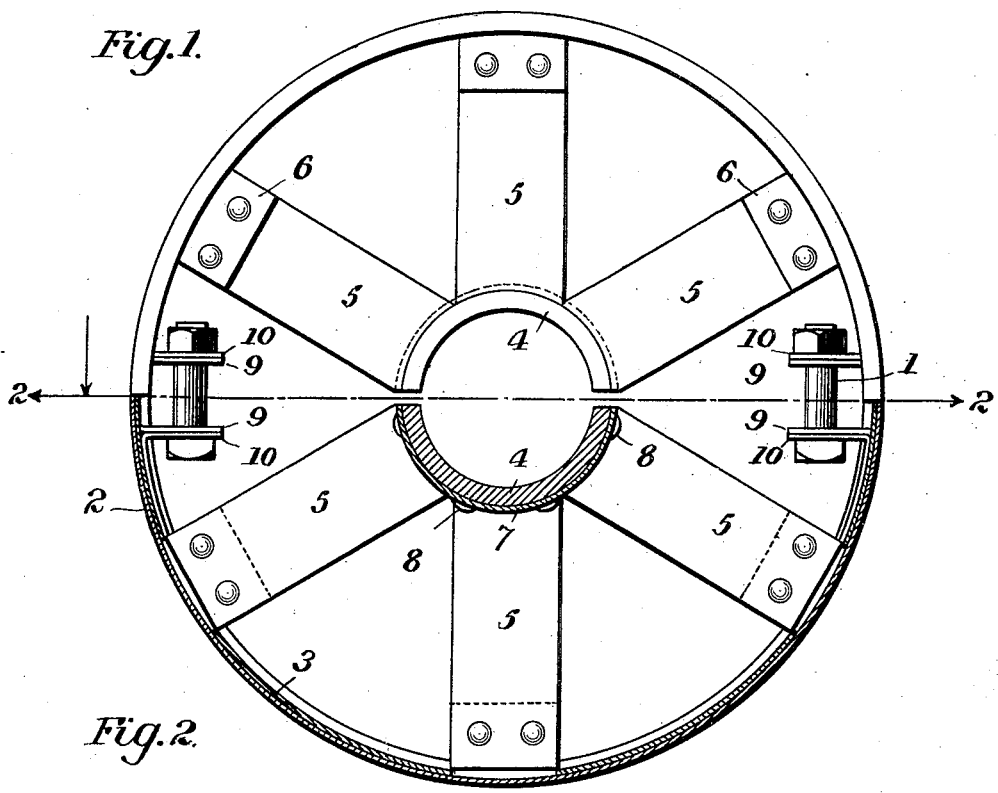
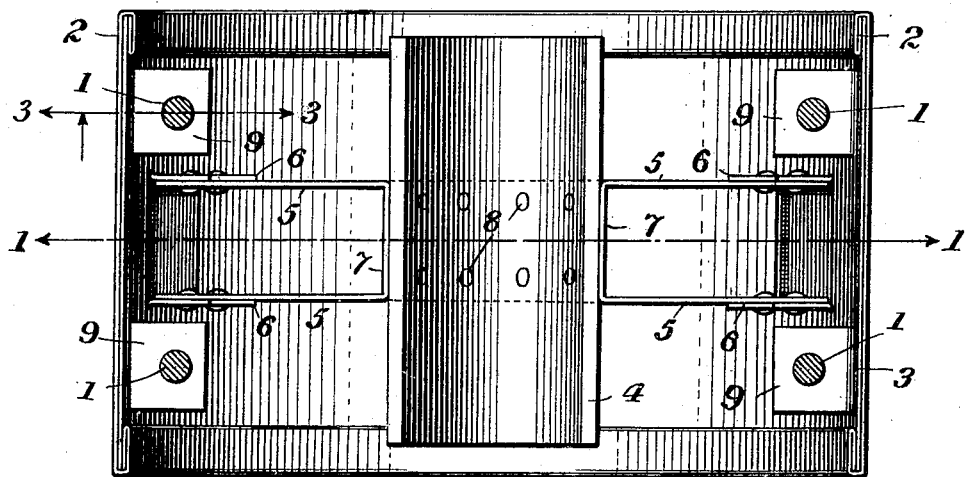
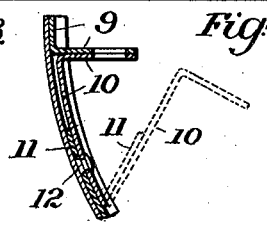
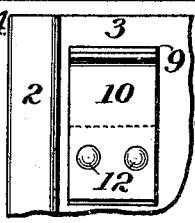

UNITED STATES PATENT OFFICE.

PATRICK D. SKAHEN, OF SYRACUSE, NEW YORK.

SECTIONAL SHEET-METAL PULLEY.

No. 917,173.      Specification of Letters Patent.      Patented April 6, 1909.

Application filed February 26, 1907. Serial No. 359,384.

*To all whom it may concern:*

Be it known that I, PATRICK D. SKAHEN, a citizen of the United States, and resident of Syracuse, Onondaga county, State of New York, have invented certain new and useful Improvements in Sectional Sheet-Metal Pulleys, of which the following is a specification.

The present invention relates to improvements in pulleys and particularly to pulleys made of metal suitably stamped or pressed into the desired form; and will be described in connection with the accompanying drawing, in which, Figure 1 is a side elevation, partly in section on the line 1—1 of Fig. 2, of a sectional pulley constructed in accordance with the present invention; Fig. 2 is a plan view of one section of the pulley, or a sectional view on the line 2—2 of Fig. 1; Fig. 3 is a detail sectional view, on the line 3—3 of Fig. 2; Fig. 4 is an inner face view of a portion of the rim of the pulley, showing the parts represented in Fig. 3.

Referring to the drawing it will be seen that the pulley comprises two similar halves, each including a hub member, a rim member and spokes connecting said hub and rim members, said halves being detachably connected by bolts 1 extending through lugs projecting inwardly from the rim members adjacent the meeting ends thereof. As shown each rim member is formed of two plates or sections, the outer section 2 being wider than the inner section 3 and having its side edges bent or folded upon itself and against the inner face of the inner section 3, whereby the pulley rim is provided with side flanges or beads of greater thickness and strength than the body of the rim. The hub member 4 of each half is connected with the inner ends of the spokes 5 the outer ends of which are riveted to lugs or ears 6 struck up from the inner rim section 3. As shown each spoke is formed by a suitable metal blank bent to provide two legs, which are riveted to lugs 6, and an intermediate portion 7 that extends longitudinally of the hub member 4 and is attached thereto by suitable rivets 8.

It will be noticed that by the construction hereinbefore described the pulley is provided with smooth side edges and the spokes are so connected with the rim and hub members, as to avoid the use of rivets or other fastening means which project beyond or in any way mar the outer rim surface.

The halves of the pulley are also connected by means lying entirely within the rim and so attached to the latter as not to weaken or in any manner affect the outer section 2 of the rim.

As shown the inner rim section of each half of the pulley is provided adjacent each end thereof with a pair of lugs, arranged on opposite sides of the spoke lugs 6 and said lugs on one member of the pulley aline with the corresponding lugs on the other member and are connected by bolts 1 as previously described. Each of said lugs 9 is formed integral with the inner rim section 3 and an angular reinforcing member or abutment 10, formed by a metal plate, is riveted to the inner rim section and abuts against said lug or ear 9, suitable alined openings being formed in said lug and abutment for the passage of bolt 1. In constructing this portion of the pulley the lug 9 is first cut from the body of the inner rim section and bent into the desired position. A similar lug or ear 11 is then bent up from the rim section 3 and the body of the abutment plate 10 is firmly secured thereto, as by rivets 12, the parts 11, 10, occupying at this time the position indicated in dotted lines in Fig. 3. After the plate 10 has been thus attached to the portion 11 of the inner rim section the latter is forced back to its original position, the body of the plate 10 extending across the aperture formed in the inner rim section by removing the lug 9 and the free end thereof abutting against said lug. By this construction it will be seen that the lugs for the connecting bolts 1 are securely connected with the rim of the pulley and that the fastening devices connecting said abutments with the rim do not extend through the outer rim section, so that the latter may have a smooth surface throughout its length.

By means of the bolts 1 the two halves of the pulley are securely connected; and as will be seen the lugs for such bolts are arranged relatively near the sides of the pulley so as not to interfere with the spokes.

A pulley constructed in accordance with this invention has a smooth periphery which is not broken or weakened in any way by the attachment of the spokes or the means for connecting the sections of the pulley together.

What is claimed is:

1. The herein described pulley comprising a hub, a sheet metal rim having a plurality of inwardly extending integral lugs, each lug being independent of every other one except for their connection by the curved rim from which they project, and spokes formed separately from and connecting the hub and said lugs.

2. The herein described pulley comprising a hub, a sheet metal rim having therein a series of incisions and having the portions that are partly separated from the body bent inwardly to form a plurality of separated lugs, and spokes formed separately from and connecting the hub and said lugs.

3. The herein described sectional pulley composed of a plurality of detachably connected sections, each section comprising a hub member, a sheet metal rim member having a plurality of inwardly extending integral lugs, each separated from the rim except at its outer edge, and spokes connecting the hub member of each section with the lugs on the rim of said section.

4. The herein described pulley comprising a hub, a metal rim provided at suitable intervals with a plurality of inwardly extending lugs, said lugs being arranged in pairs, and spokes each connected with the hub and one pair of said lugs on the rim.

5. The herein described pulley comprising a hub, a metal rim provided at suitable intervals with a plurality of inwardly extending lugs, said lugs being arranged in pairs, and spokes each formed from a single metal blank bent to provide two legs, which extend across and are connected to the members of a pair of said lugs, and an intermediate section which is connected with the hub.

6. The herein described pulley comprising a hub, a sheet metal rim having integral lugs or ears extending inwardly at suitable intervals, said lugs being arranged in pairs, and spokes each formed from a single metal blank bent to provide two legs, which extend between and are connected to the members of a pair of said lugs, and an intermediate section which is connected with the hub.

7. The herein described pulley consisting of a plurality of sections, each including a hub member, a rim member having an inner sheet metal section and an outer section suitably connected with said inner section, and spokes connecting the hub and rim members, the ends of the rim members of adjacent sections abutting throughout their width and each rim member having adjacent its ends integral lugs extending inwardly from the inner sheet metal section, and means connecting the said lugs of one pulley section with those of an adjacent section.

8. The herein described pulley comprising a plurality of sections each including a hub member, a sheet metal rim member having integral inwardly extending lugs arranged in two groups, the lugs of one group extending transversely of the rim and those of the other group extending longitudinally of the rim, and spokes connecting the hub member with the lugs that extend longitudinally of the rim member, and means connecting the transversely extending lugs of one section with the corresponding lugs of the adjacent section.

9. The herein described pulley consisting of a plurality of sections, each including a hub member, a rim member having an inner metal section and an outer section suitably connected with said inner section, spokes connecting said hub and rim members, the inner metal rim member having lugs extending toward the hub adjacent its ends, each of said lugs being reinforced by an abutment attached to the inner rim section, and means connecting said lugs on one section with those on another.

10. The herein described pulley consisting of a plurality of sections, each including a hub member, a rim member having an inner metal section and an outer section suitably connected with said inner section, spokes connecting said hub and rim members, the inner metal rim member having lugs extending toward the hub adjacent its ends, an angular abutment arranged to bear against each of said lugs, one member of said abutment being attached to the inner rim section, and means connecting said lugs on one section with those on another.

11. The herein described pulley, consisting of a plurality of sections, each including a hub member, a metal rim member, and spokes connecting said hub and rim members, the rim member of each section having adjacent its ends lugs formed by bending inwardly portions of its body, abutments attached to the rim member and bearing against said lugs, and means connecting said lugs on one section with those on another.

12. The herein described pulley, consisting of a plurality of sections, each including a hub member, a metal rim member, and spokes connecting said hub and rim members, the rim member of each section having adjacent its ends lugs formed by bending inwardly portions of its body, abutments attached to the rim member and extending across the openings produced by forming said lugs to bear against the lugs, and means connecting said lugs on one section with those on an adjacent section.

In testimony whereof I affix my signature in presence of two witnesses.

PATRICK D. SKAHEN.

Witnesses:
    LEWIS P. SMITH,
    W. G. MACKENZIE, Jr.